United States Patent
Honbo et al.

(10) Patent No.: US 6,276,417 B1
(45) Date of Patent: Aug. 21, 2001

(54) HEAVY DUTY PNEUMATIC RADIAL TIRES WITH SPECIFIED BEAD CORE COMPRESSION RATIO

(75) Inventors: Yoichi Honbo, Iruma; Shuji Ando, Kodaira, both of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/379,600

(22) Filed: Aug. 24, 1999

(30) Foreign Application Priority Data

Aug. 24, 1998 (JP) .................................. 10-237028

(51) Int. Cl.$^7$ .............................. B60C 15/02; B60C 15/04
(52) U.S. Cl. ............................................. 152/540; 152/544
(58) Field of Search ..................................... 152/544, 540

(56) References Cited

U.S. PATENT DOCUMENTS 4,998,575 * 3/1991 Kanamaru ........................ 152/544 X
5,464,051 * 11/1995 Beard et al. ...................... 152/544 X
5,772,811 * 6/1998 Ueyoko et al. ....................... 152/540

FOREIGN PATENT DOCUMENTS

| 39 36 231 A1 | * 5/1990 | (DE) | ..................................... 152/540 |
| 0 129 675 A1 | 1/1985 | (EP) . | |
| 0 652 120 A1 | 5/1995 | (EP) . | |
| 0 749 855 A1 | 12/1996 | (EP) . | |
| 9-39519 A | 2/1997 | (JP) . | |

* cited by examiner

*Primary Examiner*—Adrienne C. Johnstone
(74) *Attorney, Agent, or Firm*—Sughrue, Mion, Zinn, Macpeak & Seas, PLLC

(57) ABSTRACT

A heavy duty pneumatic radial tire comprises a pair of bead portions each containing a bead core, a radial carcass, a belt comprised of at least one belt layer, and a tread, in which (1) a tapering angle $\theta_C$ of an inner side of the bead core in the radial direction is within ±2° of a tapering angle $\theta_R$ of a bead seat part in an approved rim, and (2) a compression ratio Ca at a widthwise inner end of the inner side of the bead core is within a range of 102–115% of a compression ratio Cb at a widthwise outer end thereof.

3 Claims, 1 Drawing Sheet

HEAVY DUTY PNEUMATIC RADIAL TIRES WITH SPECIFIED BEAD CORE COMPRESSION RATIO

BACKGROUND OF THE INVENTION

1. Field of the Invention

This invention relates to a pneumatic tire and more particularly to a heavy duty pneumatic radial tire for use in, for example, construction vehicles comprising a pair of bead portions each including a bead core embedded therein, a radial carcass of a rubberized cord ply extending between the pair of the bead portions and wound around each bead core from the inside of the tire toward the outside thereof, a belt superimposed about a crown portion of the carcass and comprised of at least one belt layer, and a tread disposed on an outside of the belt in the radial direction.

2. Description of Related Art

In the conventional heavy duty pneumatic radial tire, the bead core is at a horizontal state in an axial direction of the tire or a tapering angle $\theta_C$ of an inner side of the bead core in the radial direction is zero. A bead base of the bead portion is tapered so that an inner diameter of a bead base face is gradually decreased from a bead heel part toward a bead toe part. In this case, a tapering angle $\theta_B$ of the bead base in the tire is somewhat larger than a tapering angle $\theta_R$ of a bead seat in a rim and is set to a degree of $(\theta_R+\alpha)$, whereby a tightening margin is held between the tire and the rim.

In such a conventional tire, when a large torque is applied to the tire, slippage is caused between the bead base portion of the tire and the bead seat of the rim and hence there is a tendency that rubber beneath the bead core, particularly rubber in a bead heel part is worn to easily cause a trouble of air leakage.

This is due to the fact that since the inner side of the bead core in the radial direction is parallel or substantially parallel to the axial direction of the tire and the bead base of the bead portion is tapered, the pressure to the bead heel part becomes high and the pressure to the bead toe part becomes small and hence rubber is worn at the side of the bead heel part subjected to a high pressure.

SUMMARY OF THE INVENTION

It is, therefore, an object of the invention to solve the aforementioned problem of the conventional technique and to provide a heavy duty pneumatic radial tire hardly causing the rim slippage.

According to the invention, there is the provision of a heavy duty pneumatic radial tire comprising a pair of bead portions each including a bead core embedded therein, a radial carcass of a rubberized cord ply extending between the pair of the bead portions and wound around each bead core from the inside of the tire toward the outside thereof, a belt superimposed about a crown portion of the carcass and comprised of at least one belt layer, and a tread disposed on an outside of the belt in the radial direction, in which (1) a tapering angle $\theta_C$ of an inner side of the bead core in the radial direction is within ±2° of a tapering angle $\theta_R$ of a bead seat part in an approved rim, and (2) as a tightening margin between the inner side of the bead core in the radial direction and the bead seat part of the approved rim when the tire is mounted onto the approved rim and inflated under a standard internal pressure, a compression ratio Ca at a widthwise inner end of the inner side of the bead core is within a range of 102–115% of a compression ratio Cb at a widthwise outer end thereof when a value obtained by dividing a thickness from the inner side of the bead core in the radial direction to a bottom face of the bead seat part excluding a thickness of a metal cord member by a thickness prior to the mounting onto the approved rim is a compression ratio C.

In preferable embodiments of the invention, a tapering angle $\theta_B$ of a bead base in the bead portion is made larger by 0.5–3° than the tapering angle $\theta_C$ of the inner side of the bead core in the radial direction, and a compression ratio Cc at a widthwise center c of the inner side of the bead core in the radial direction is within ±10% of an average value (Ca+Cb)/2 of the compression ratio Ca at the widthwise inner end of the inner side of the bead core and the compression ratio Cb at the widthwise outer end thereof.

BRIEF DESCRIPTION OF THE DRAWING

The invention will be described with reference to the accompanying drawing, wherein.

DESCRIPTION OF PREFERRED EMBODIMENTS

Figure 1:
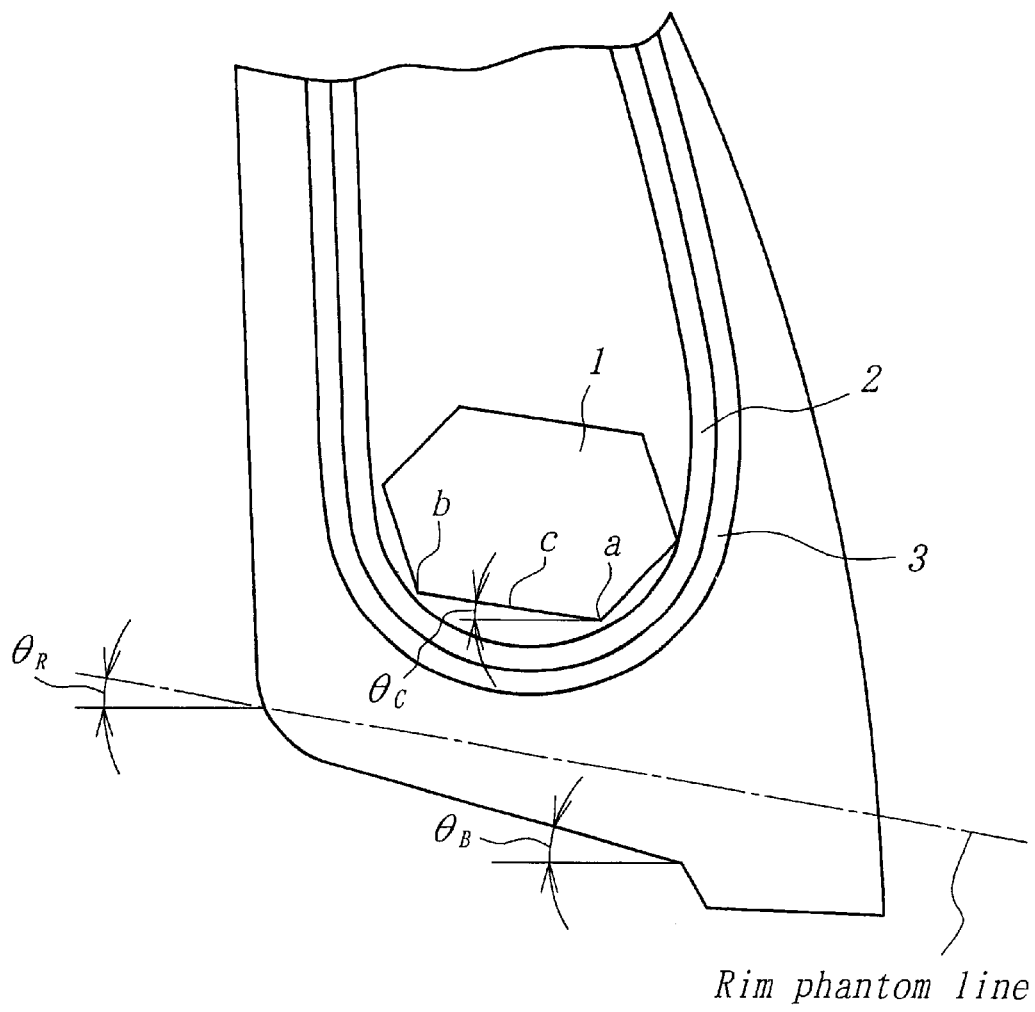
FIG. 1 is a diagrammatically partial section view of a bead portion in the pneumatic radial tire according to the invention.

The pneumatic tire is used by mounting onto a standard rim defined in accordance with a tire size according to JATMA (Japan), TRA (USA), ETRTO (EPC) or the like. Such a standard rim is usually as an approved rim. Throughout the specification, the term "approved rim" used herein means a standard rim in accordance with applied size and ply rating defined in 1998 YEAR BOOK published by TRA.

In the tire according to the invention, (1) the tapering angle $\theta_C$ of the inner side of the bead core in the radial direction is within ±2° of the tapering angle $\theta_R$ of the bead seat part in the approved rim, and (2) as a tightening margin between the inner side of the bead core in the radial direction and the bead seat part of the approved rim, the compression ratio Ca at the widthwise inner end of the inner side of the bead core is within a range of 102–115% of the compression ratio Cb at the widthwise outer end thereof, so that when the tire is assembled onto the approved rim and inflated under a standard internal pressure, a peak value of the pressure in the bead heel part lowers and the pressure in the bead toe part relatively rises as compared with the conventional tire, and as a result the pressure distribution between the bead base of the tire and the bead seat of the rim is more uniformized to increase friction force of the bead base as a whole under loading and hence the occurrence of rim slippage is prevented or controlled.

Also, the tapering angle $\theta_C$ of the inner side of the bead core in the radial direction becomes equal to the tapering angle $\theta_R$ of the bead seat in the approved rim, so that the rim mounting is easy. When the difference of the tapering angle is outside the range of ±2°, the rim mounting and the resistance to rim slippage are badly affected.

When the compression ratio Ca at the widthwise innermost end a of the inner side of the bead core is less than 102% of the compression ratio Cb at the widthwise outermost end b thereof, the peak value of the pressure in the bead heel part can not effectively be decreased, while when it exceeds 115%, rubber gauge of the bead toe part becomes too thick and there are caused inconveniences in the rim mounting and the cost.

In the tire according to the invention, it is favorable that the tapering angle $\theta_B$ of the bead base of the bead portion is larger by 0.5–3° than the tapering angle $\theta_C$ of the inner side of the bead core in the radial direction. When the difference of the tapering angle is less than 0.5°, the peak value of the pressure in the bead heel part can not effectively be decreased. When it exceeds 3°, rubber gauge of the bead toe part becomes too thick and there are caused inconveniences in the rim mounting and the cost.

In the tire according to the invention, it is also favorable that the compression ratio Cc at the widthwise center c of the inner side of the bead core in the radial direction is within ±10% of an average value (Ca+Cb)/2 of the compression ratio Ca at the widthwise inner end of the inner side of the bead core and the compression ratio Cb at the widthwise outer end thereof. In this case, smooth rim mounting is attained.

The following examples are given in illustration of the invention and are not intended as limitations thereof.

There are provided heavy duty pneumatic radial tires for construction vehicle of Examples 1–4 according to the invention and the conventional heavy duty pneumatic radial tire for construction vehicle. These tires have a tire size of 26.5R25. Each of these tires is used by mounting onto an approved rim of 25×22.00/3.00.

FIG. 1 is a diagrammatically partial section view of a bead portion in the heavy duty pneumatic radial tire of Example 1 according to the invention.

The tire of Example 1 comprises a pair of bead portions each including a bead core 1 embedded therein, a radial carcass 2 of a rubberized cord ply extending between the pair of the bead portions and wound around each bead core 1 from the inside of the tire toward the outside thereof, a wire chafer 3 arranged in the bead portion along the carcass 2, a belt superimposed about a crown portion of the carcass 2 (not shown) and a tread arranged on the outside of the belt in the radial direction (not shown).

In this tire, a tapering angle $\theta_C$ of an inner side of the bead core 1 in the radial direction is 5°, while a tapering angle $\theta_R$ of a bead seat of the approved rim is 5°, so that both the tapering angles have a relation of $\theta_C = \theta_R$.

Also, a compression ratio Ca at a widthwise innermost end a of the inner side of the bead core 1 is 102.5% of a compression ratio Cb at a widthwise outermost end b thereof as a tightening margin to the approved rim when the compression ratio is calculated by excluding a metal component existing inward from the bead core 1 in the radial direction. In this case, steel cords used in the carcass 2 and the wire chafer 3 correspond to the metal component.

Further, a tapering angle $\theta_B$ of a bead base in the bead portion is larger by 1° than the tapering angle $\theta_C$ of the inner side of the bead core 1 in the radial direction.

The heavy duty pneumatic radial tire of Example 2 is substantially the same as the tire of Example 1 except that the tapering angle $\theta_B$ of the bead base is 7° and the compression ratio Ca at the widthwise innermost end a of the inner side of the bead core 1 is 105.5% of the compression ratio Cb thereof.

The heavy duty pneumatic radial tire of Example 3 is substantially the same as the tire of Example 1 except that the tapering angle $\theta_B$ of the bead base is 8° and the compression ratio Ca at the widthwise innermost end a of the inner side of the bead core 1 is 110% of the compression ratio Cb thereof.

The heavy duty pneumatic radial tire of Example 4 is substantially the same as the tire of Example 1 except that the tapering angle $\theta_C$ of the inner side of the bead core 1 in the radial direction is 6° and the tapering angle $\theta_B$ of the bead base is 7° and the compression ratio Ca at the widthwise innermost end a of the inner side of the bead core 1 is 104% of the compression ratio Cb thereof.

The conventional heavy duty pneumatic radial tire is substantially the same as the tire of Example 1 except that the tapering angle $\theta_C$ of the inner side of the bead core 1 in the radial direction is zero degree and the compression ratio Ca at the widthwise innermost end a of the inner side of the bead core 1 is 95% of the compression ratio Cb thereof.

Then, a test for the evaluation of resistance to rim slippage is carried out with respect to the tires of Examples 1–4 and the conventional example.

The resistance to rim slippage is evaluated by moving a plate contacting with the tread at a state of braking the tire in a static load testing machine to measure a rim slipping force produced in the bead portion.

As a result of the above test, when the rim slipping force of the conventional example is 100, the index value of the rim slipping force is 135, 149, 161 and 142 in the tires of Examples 1–4, respectively. The larger the numerical index value, the better the resistance to rim slippage.

The above test results are shown in Table 1 together with outlines of the tires in Examples 1–4 and conventional tire.

TABLE 1

|  | $\theta_R$ | $\theta_C$ | $\theta_B$ | Ca/Cb | Rim slipping force |
|---|---|---|---|---|---|
| Conventional Example | 5 | 0 | 6 | 95 | 100 |
| Example 1 | 5 | 5 | 6 | 102.5 | 135 |
| Example 2 | 5 | 5 | 7 | 105.5 | 149 |
| Example 3 | 5 | 5 | 8 | 110 | 161 |
| Example 4 | 5 | 6 | 7 | 104 | 142 |

As seen from the above test results, the invention provides tires having an excellent resistance to rim slippage.

What is claimed is:

1. A heavy duty pneumatic radial tire comprising a pair of bead portions each including a bead core embedded therein, a radial carcass of a rubberized cord ply extending between the pair of the bead portions and wound around each bead core from the inside of the tire toward the outside thereof, a belt superimposed about a crown portion of the carcass and comprised of at least one belt layer, and a tread disposed on an outside of the belt in the radial direction, in which (1) a tapering angle $\theta_C$ of an inner side of the bead core in the radial direction is within ±2° of a tapering angle $\theta_R$ of a bead seat part in an approved rim, and (2) as a tightening margin between the inner side of the bead core in the radial direction and the bead seat part of the approved rim when the tire is mounted onto the approved rim and inflated under a standard internal pressure, a compression ratio Ca at a widthwise inner end of the inner side of the bead core is within a range of 102–115% of a compression ratio Cb at a widthwise outer end thereof when a value obtained by dividing a thickness from the inner side of the bead core in the radial direction to a bottom face of the bead seat part excluding a thickness of a metal cord member by a thickness prior to the mounting onto the approved rim is a compression ratio C.

2. A heavy duty pneumatic radial tire according to claim 1, wherein a tapering angle $\theta_B$ of a bead base in the bead portion is made larger by 0.5–3° than the tapering angle $\theta_C$ of the inner side of the bead core in the radial direction.

3. A heavy duty pneumatic radial tire according to claim 1, wherein a compression ratio Cc at a widthwise center c of the inner side of the bead core in the radial direction is within ±10% of an average value (Ca+Cb)/2 of the compression ratio Ca at the widthwise inner end of the inner side of the bead core and the compression ratio Cb at the widthwise outer end thereof.

* * * * *